G. V. PRASCA.
COMPUTING APPARATUS.
APPLICATION FILED MAR. 18, 1918.
1,315,576.
Patented Sept. 9, 1919.
3 SHEETS—SHEET 1.
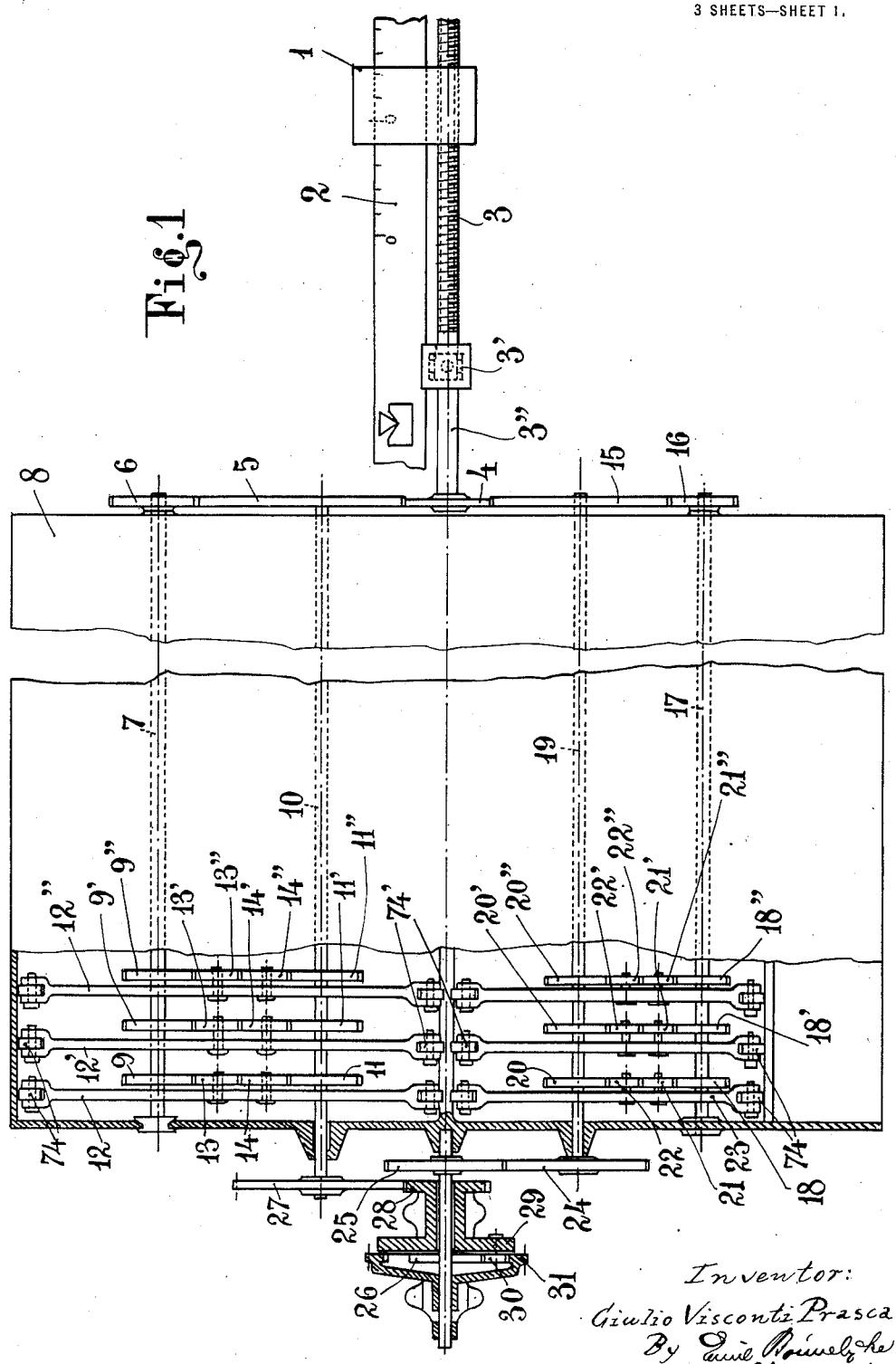
Inventor:
Giulio Visconti Prasca
By [signature]
Attorney.

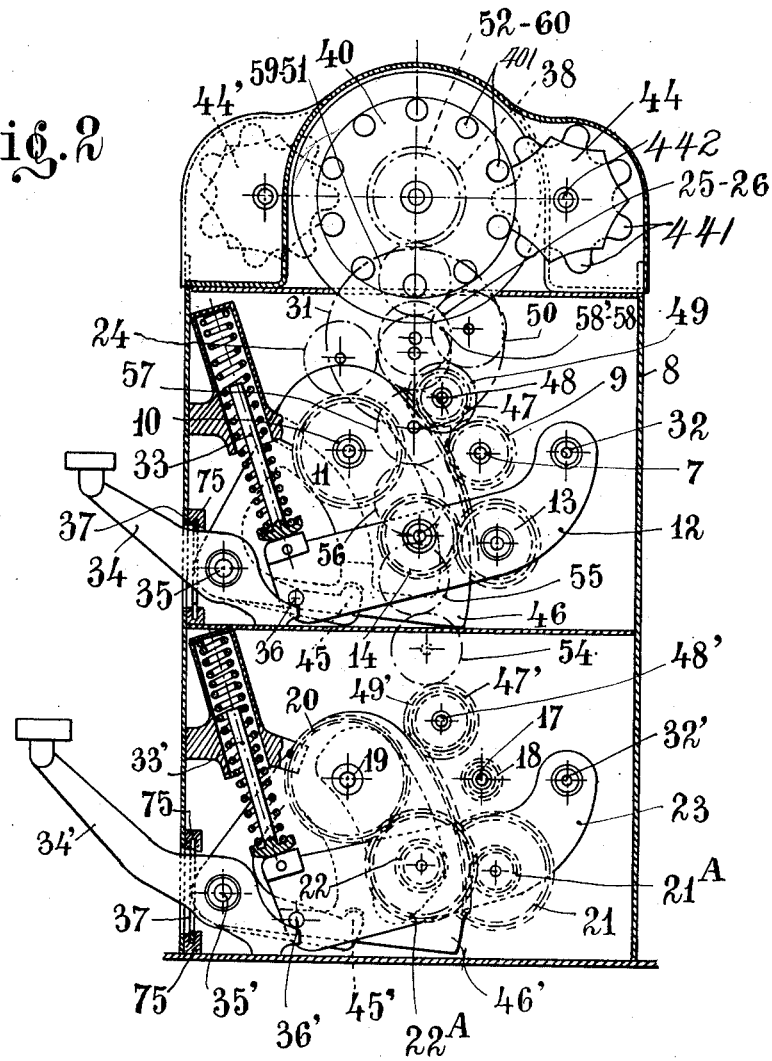

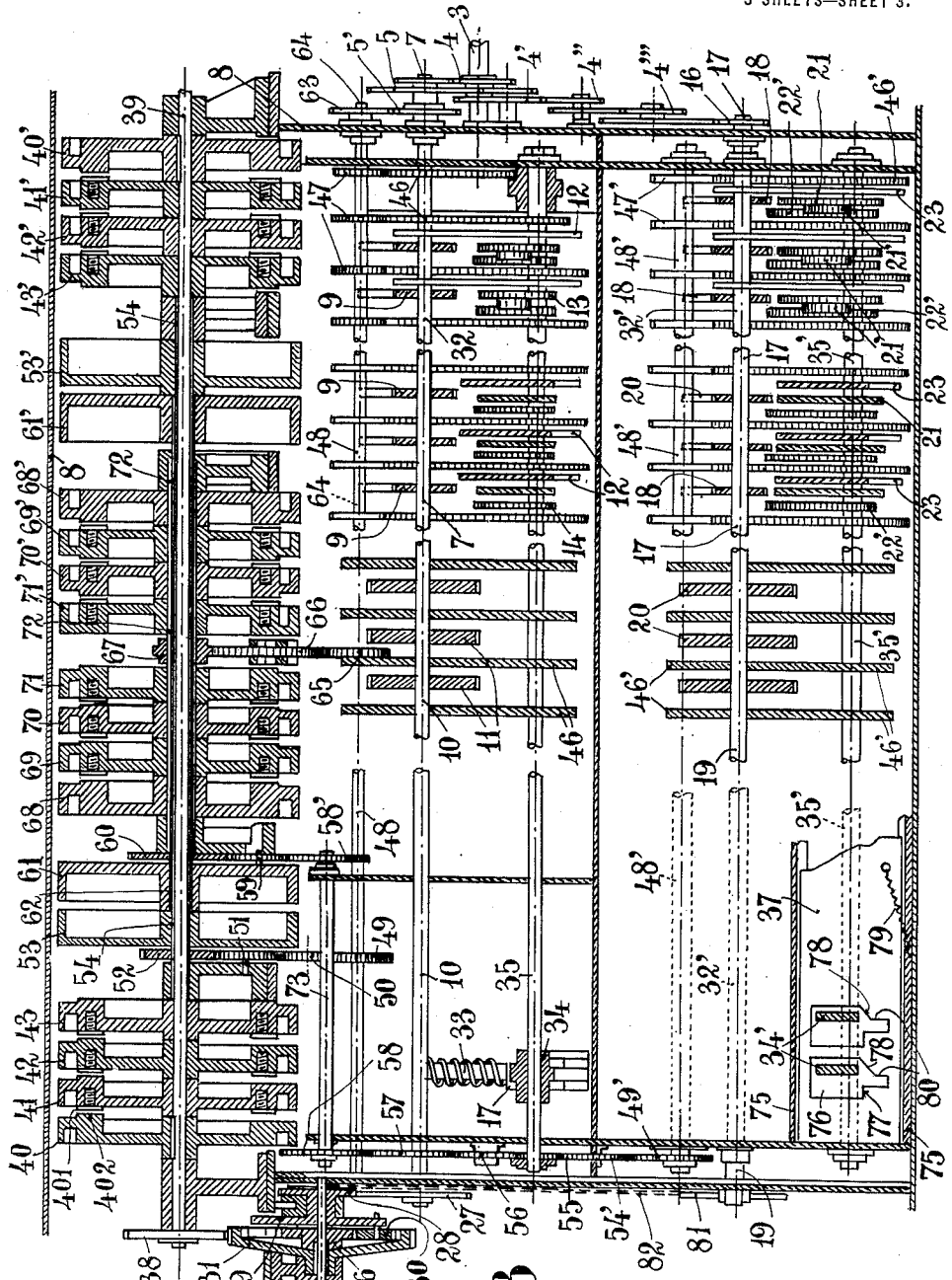

UNITED STATES PATENT OFFICE.

GIULIO VISCONTI PRASCA, OF LA SPEZIA, ITALY.

COMPUTING APPARATUS.

1,315,576.     Specification of Letters Patent.     Patented Sept. 9, 1919.

Application filed March 18, 1918. Serial No. 223,178.

*To all whom it may concern:*

Be it known that I, GIULIO VISCONTI PRASCA, subject of the King of Italy, residing at La Spezia, Italy, have invented certain new and useful Improvements in Computing Apparatus, of which the following is a specification.

This invention has for its object an apparatus adapted to be applied to steel-yards, scales or the like, and generally to weighing or measuring apparatus for materials of any kind.

The invention comprises an apparatus which gives automatically the total cost of the weighed or measured material, said cost being calculated on the basis of any desired unit of cost which may be stated and modified at will; further the apparatus according to this invention indicates directly the weight or quantity of the measured material as well as the corresponding cost unit so as to give all the data required for verifying the amount computed by the apparatus.

In the annexed drawings:

Figure 1 shows a diagrammatic front elevation, with parts broken away and in section of an apparatus according to this invention as applied to a steel-yard;

Fig. 2 is a transverse section of the apparatus, and

Fig. 3 is a central longitudinal section thereof, a portion of similar members being omitted or broken off for reason of clearness.

The apparatus shown in Fig. 1 is intended to be applied to a steel-yard and allows of obtaining directly the cost of the material weighed, said cost being given in monetary units and fractions.

As shown in said figure, the weight 1, which is mounted to slide on the graduated rod 2 of the steel-yard, is controlled by a screw-threaded spindle 3 engaging a screw threaded hole provided in said weight 1.

Said spindle 3 is actuated by any suitable means, not shown, as a handle, a hand wheel or the like, and is connected by means of a universal joint 3′ with a shaft 3″ to which is fixed a pinion 4.

The screw thread of said spindle 3 must have such a pitch as to cause the weight 1 to be displaced along the rod 2 to an extent corresponding with one weight unit when to the spindle 3 is imparted a number of complete revolutions, say ten revolutions by way of example.

The pinion 4 operated by the spindle 3, as above described, actuates the pinions 5 and 6 and the shaft 7 which latter has the pinion 6 secured to it and is journalled in the casing 8 of the apparatus; said shaft 7 is provided with a number of pinions 9. A shaft 10 is arranged parallel with shaft 7 and has fixed to it a like number of pinions 11, each of which corresponds with one of said pinions 9. . . . Inside the casing 8, a plurality of frames 12, . . . are mounted which are capable of being shifted independently of each other from outside, each of them being provided with pinions 13—14, . . . adapted to engage the corresponding pinions 9—11, . . . respectively.

As shown by way of example in Fig. 1, the frames 12 may be pivoted at their upper ends in eyes 74 provided in the casing 8 and be controlled by rods having eyes 74′ connected with the other ends of said frames.

The gears 9—13, 14—11 must have different transmission ratios, and the transmission ratio of each of them must exactly correspond to one of the price units on the basis of which the machine is set to calculate; that is to say, it must be such that for a given rotation of spindle 3, the shaft 10 must rotate an extent proportional to the product of rotation of spindle 3 multiplied by the cost unit corresponding to the particular train of gears which has been brought into action by the operator, and which, in consequence, couples the shafts 3 and 10.

By way of example, by assuming that it is desired to calculate in dollars and nickels the cost of a given weight of material measured in lbs, and that the spindle 3 must be rotated through ten revolutions in order to displace the weight 1 on its rod 2 to the extent corresponding with one lb., the transmission ratio of the gear 4—5—6 must be such as to cause the shaft 7 to rotate 1/20 of a revolution when the spindle 3 is rotated through ten revolutions, and the transmission ratio of the several gears 9—11, pivoted on the respective frame 12, must have the value of 1/1, 1/2, 1/3 . . . up to 1/19.

When the weight 1 is displaced from the zero of its rod to the extent required to balance the load, the shaft 7 is rotated 1/20 of a revolution that is of 5/100 of a revolution, for each unit and this rotation of shaft 7 is transmitted to shaft 10 under any one of the ratios 1/1 (5/100), 1/2 (10/100), 1/3

(15/100) ... up to 1/19 (95/100) according to the particular gear which has been carried into engagement with the associate pinions fixed on said shafts 7 and 10. The shaft 10 will thus be rotated through an angle proportional with the weight of the load multiplied by the desired unit of cost.

To avoid the necessity for a large number of gears in order to use as cost unit any desired value in units and fractions, the apparatus may be provided with two independent devices like the one above described one of which is intended to take into account the unit and its multiples, while the other one is intended to take into account the unit fractions, the revolutions of the driven shafts of said two devices being added together by any suitable means adapted to give the total cost.

Obviously, instead of two devices, a larger number may be used in particular cases; by way of example there may be three devices for calculating the cost in pounds sterling, shillings and pence.

In the construction shown by way of example in Fig. 1, the spindle 3 operates by means of the gear train 4—15—16, a device like the one above described, this device being intended to take into account the unit values of the cost.

This device comprises a shaft 17 provided with a given number of pinions 18, ... and a shaft 19 alining therewith and provided with pinions 20, ... each corresponding with one of the above named pinions 18. As above described, the rotation of the shaft 17 is transmitted to the shaft 19 by means of a number of gears 21—22 ... carried by frames 23 which may be controlled from outside so that any desired gear 21—22, may be carried into engagement with the corresponding pinions 18—20 according to the values of the cost unit desired.

The total transmission ratios of the several gears 18—21—22—20, must be different from one another, that is 1/1, 1/2, 1/3 ... and so on up to a ratio corresponding to the maximum unit price which the apparatus can compute, for example 1/19 if the apparatus must compute for a maximum cost unit of 19; the ratio of gears 4—15—16 must in turn be such as to cause shaft 17 to turn a complete revolution when the spindle 3 is rotated through the angle required for displacing the weight 1 to the extent corresponding with one weight unit, that is ten complete revolutions in the construction shown by way of example on the drawing.

Thence by carrying into engagement the gear 18—21—22—20 corresponding with unit values of the desired cost unit, the shaft 19 is caused to rotate through an angle proportional with the measured weight multiplied by the units of the desired cost unit.

To obtain the total cost in money units and fractions of the weighed material, it is sufficient to add together the revolutions of shafts 10 and 19; this may be obtained by means of a differential gear as shown in the drawing. In the construction illustrated the shaft 19 actuates, by means of pinions 24—25, the sun pinion 26 of a differential gear, while the shaft 10 operates, by means of pinions 27 and 28, the member 29 carrying the idle pinion 30. Consequently the driven pinion 31 of the differential gear is rotated to an extent corresponding with the sum of the revolutions of shafts 10 and 19, and thence to an extent proportional with the measured weight multiplied by the desired cost unit in money units and fractions.

Assuming by way of example that the desired cost unit is of two money units and 10/100 of unity for each weight unit, the operator carries into operation the gear 9—11 corresponding with the transmission ratio 1/2 between shafts 7 and 10 and the gear 18—20 corresponding with the transmission ratio 1/2 between shafts 17 and 19. The weight 1 is then displaced by operating the spindle 3, from the 0 of its rod 2 until the load is balanced; said spindle will be rotated 35 complete revolutions, assuming that the load weight is by way of example, 95 3, 5 weight units. The shaft 7 is thus rotated 3,5/20 or 17,5/100 of a revolution and the shaft 10 is rotated 35/100 of a revolution, while shafts 17 and 19 are rotated 3, 5 revolutions and 7 revolutions respectively. Thence the driven pinion 31 of the differential gear is rotated to an extent proportional with 7, 35 money units this being the cost of the weighed material according to the assumed cost unit price.

Obviously a single one of the gears of the gears 9—11, and a single one of the gears 18—20, must be carried into engagement each time; to this end a mechanism such as the one subsequently described may be used to prevent all of the other frames 12 and 23 from being shifted when one of them has been actuated to carry its gear into operation.

The rotation of the driven pinion 31 of the differential gear may be utilized to operate an integrating or recording device of any suitable kind.

Figs. 2 and 3 show in transverse and longitudinal section respectively a form of apparatus answering this purpose.

As shown in said figures the mechanism, which is inclosed in the casing 8, comprises a pinion 4 which is operated by a spindle 3; this latter is operated in proper relation with a member (not shown) of the weighing or measuring apparatus, said member being moved in accordance with the quantity of the weighed or measured material, as, by way of example, by a steel-yard as described in connection with Fig. 1. Said pinion 4 operates by means of a pinion 5, the shaft 7 provided with a number of pinions 9, rigid therewith as above described (see Fig. 3). Each of the pinions 9, is intended to drive the associate pinion 11, rigid on the shaft 10, under the desired gearing ratio. The shaft 10 in turn operates by means of pinions 27 and 28 the member 29 and thence the idle pinion 30 of the differential gearing.

The transmission between each pinion 9 of shaft 7 and the associate pinion 11 solid with shaft 10 is obtained by means of pinion pairs 13—14, rotatably mounted on their respective frames 12. The frames 12 are pivoted on a rod 32 and are shifted from outside by means of key levers 34 pivoted on the rod 35 and capable of engaging by their lower ends, the projections 36 of the respective frames 12 (Fig. 2). The spring operated pins 33 are intended to hold the frames 12 in their disengaged position. In the front wall of the casing 8 (Figs. 2 and 3) a plate 37 is mounted which is adapted to slide axially in guides 75 and provided with a series of openings 76 having a projection 77 and an inclined edge 78, each of the key levers 34 passing through one of said openings. When one of the levers 34 is shifted to carry the respective frame and gear into operation, its lower edge comes into engagement with the inclined edge 78 of its opening 76 so that the plate 37 is displaced and the projections 77 of the respective openings are carried under the edges of the other key levers in order to lock the same and prevent them from being operated by mistake.

A spiral spring 79 attached to said plate 37 and to the casing 8 acts to restore the plate 37 in its original position when the key lever 34 is raised after completing the operation of the apparatus; further said plate 37 serves also to hold lowered the key lever 34 owing to the friction exerted by the straight portion 80 of the edge of the opening against the key lever under the pressure of spring 79.

The device intended for the unit and unit multiple values of the cost unit comprises a shaft 17 actuated by pinion 4 through the intermediary of the gear train 4'—4"—4'"—16; said shaft is provided with a number of pinions 18, each of which is intended to drive the associate pinion 20, solid with the shaft 19. This latter shaft actuates, by means of a pinion 81, chain 82 and pinion 25, the sun pinion 26 of the differential gear.

The operation of pinions 20, by the respective associate pinions 18, is obtained by the intermediate of gears 21, 21', 22, 22' which are pivoted on frames 23 controlled in the above described manner by a device comprising the members 33', 34', 35', 36', 37'.

The resulting rotation of the driven pinion 31 of the differential gear is transmitted by means of the pinion 38 to the shaft 39 which controls two revolution counters of any known type mounted symmetrically at the opposite ends of the machine in such a manner that one faces the buyer and the other the seller, so as to show at the same time at the two sides of the apparatus the computed price of the material weighed or measured.

In the construction illustrated, one counter comprises the gears 40, 41, 42 and 43, and the other comprises the gears 40', 41', 42' and 43". The two gears 40 and 40' are fast on shaft 39, while the remaining gears of both sets are loose.

The gears 41, 42 and 43 (or 41', 42' and 43') are each provided with ten studs 401 (disposed upon the left-hand faces of the left-hand set in Fig. 3, and on the right-hand faces of the right-hand set); while the gears 40, 41 and 42 (or 40', 41' and 42') are each provided on the opposite face thereof with a single stud 402. Between each pair of adjacent wheels project the teeth 441 of a wheel 44 (or 44'), Fig. 2, loosely mounted on a shaft 442 parallel with shaft 39. Consequently, at each turn of shaft 39, the gear 40 will be turned and will cause the wheel 44 disposed between the gears 40 and 41 to turn one tooth space. Similarly, each time gear 41 turns the gear 42 will turn one tooth space, due to the action of the gear 44 disposed between gears 41 and 42, and so on. It is apparent that if the peripheries of the gears 40, 41, 42 and 43 (and of the gears 40', 41', 42' and 43') are marked equidistantly with the figures 0—9, they will indicate the number of revolutions made by the shaft 39.

In order to show which key is depressed and consequently, to indicate the cost unit serving as a basis of calculation, each key lever 34 employed to operate one of the frames which carry the gears 21—22, is provided with a tooth 45 adapted to engage a toothed sector 46, each sector meshing with a pinion 47. All of the pinions 47 are fixed to a shaft 48 which drives through the intermediate gears 49—50—51—52, a drum 53 on the periphery of which are marked the several money unit fractions so as to bring into register with an opening provided in the casing 8 the figures corresponding with the money unit fractions of the desired cost unit, according to the particular key lever 34 which has been shifted, and hence to the gear ratio of the pinions 13—14 carried into operation. The drum 53 is fast on a hollow shaft 54 which carries a like drum 53' in order to show said figures on the two sides of the apparatus. The various quadrants 46 have a different number of teeth so as to rotate the drums 53—53' through the proper angle according to the gears 13—14, 13'—14' which have been carried into operation.

A like arrangement is used for the device of the money units (say for example a dollar and multiple thereof); as shown in Figs. 2 and 3, the lug 45' of each key lever 34' actuates a quadrant 46' which drives the pinion 47' when the key lever 34' is operated. The pinion 47' is fixed to a shaft 48' which drives the gear train 49'—54—55—56—57—58, the shaft 73, pinions 58' 59—50 and finally the drums 61—61' carrying the proper figures and connected together by the hollow shaft 62.

Finally it is also possible to obtain a reading of the weight or quantity of material measured by the measuring apparatus. This may be obtained by a revolution counter operated by the spindle 3 of said measuring apparatus. To this end the wheel 4, which is operated by the spindle 3, drives pinions 5'—63, the shaft 64, pinions 65—66—67, which latter actuate the two sets of counting wheels 68, 69, 70, 71 and 68', 69', 70', 71', the corresponding wheels of the two sets being connected together by the hollow shaft 72 and being intended to show at the two sides of the apparatus the total weight or generally the total measure made by the apparatus.

The described apparatus allows of obtaining a reading of the total cost of a given quantity of material weighed or measured, said cost being calculated on the basis of any given unit of cost in terms of money unity, its multiples and fractions, as well as a reading of the quantity of the material measured and of the unit of cost price, so that the data given by the apparatus and the operation of the same may be easily verified by the interested parties.

What I claim as my invention and desire to secure by United States Letters Patent is:

1. An apparatus for computing the cost of quantities of material measured by a measuring apparatus, comprising a driving shaft operated in given relation with a moving member of said measuring apparatus; a set of pinions fixed to said shaft; a driven shaft parallel with said driving shaft; a set of pinions on the driven shaft, each second-named pinion corresponding with one of the first-named pinions; a plurality of gears each having a transmission ratio corresponding with a price unit; a carrier frame individual to each of said gears; a set of keys, one individual to each frame, for rocking said frames to bring them in engagement with the corresponding pinions of the driving and driven shafts; and means operated by said driven shaft to give an indication of the result.

2. An apparatus for computing the cost of quantities of material measured by a measuring apparatus, comprising two driving shafts each operated in given relation with a moving member of said measuring apparatus; a set of pinions fixed to each of said driving shafts; two driven shafts each parallel with one of said driving shafts; a set of pinions fixed to each driven shafts, each second-named pinion corresponding with a pinion on the associated driving shaft; two series of gears, each gear having a transmission ratio corresponding with a figure of a price unit; two series of frames each carrying one of said gears; key-operated means for actuating said frames to bring them in engagement with the corresponding pinions of the associated driving and driven shafts; means for adding together the rotations of the driven shafts; means operated by said adding means to give an indication of the totals; and means operated by each key to indicate the gear brought in engagement.

3. An apparatus for computing the cost of quantities of material measured by a measuring apparatus, comprising a plurality of driving shafts, each operated in given relation with a moving member of said measuring apparatus; a set of pinions fixed to each driving shaft; a plurality of driven shafts, each parallel with one of said driving shafts; a set of pinions fixed to each driven shaft, each second-named pinion corresponding with a pinion on the associated driving shaft; a plurality of series of gears, each gear having a transmission ratio corresponding with a figure of a price unit; a plurality of series of frames, each carrying one of said gears; key-operated means for actuating said frames to bring them in engagement with the corresponding pinions of the associated driving and driven shafts; means for adding together the rotations of the driven shafts; means operated by said adding means to give an indication of the totals; and means operated by each key to indicate the gear brought in engagement.

4. An apparatus for computing the cost of quantities of material measured by a measuring apparatus, comprising driving shafts each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for giving an indication of the sum of said rotations, means for shifting any of said gears into such engagement at will, and means for preventing shifting of other gears when one of them has been carried into operation.

5. An apparatus for computing the cost of quantities of material measured by a measuring apparatus, comprising driving shafts each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for giving an indication of the sum of said rotations, means for shifting any of said gears into such engagement at will, and means operated by said shifting means to indicate the gear carried into operation.

6. An apparatus for computing the cost of quantities of material measured by a measuring apparatus, comprising driving shafts each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for shifting any of said gears into such engagement at will, means to give an indication of the sum of said rotations, means for indicating the gears carried into engagement, and means for indicating the value of the displacement of said moving part of the measuring apparatus.

7. An apparatus for computing the cost of quantities of material measured by a measuring apparatus, comprising driving shafts each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for shifting any of said gears into such engagement at will, and means for indicating at the two sides of the apparatus the sum of said rotations as well as the gear carried into operation and the displacement of the moving part of said measuring apparatus.

8. An apparatus for computing the cost of quantities of material measured by a measuring apparatus, comprising driving shafts each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for indicating the sum of said rotations, means for shifting any of said gears into such engagement at will, a slidable plate for each pair of associate driven and driving shafts having openings, operating parts for said gears each passing through one of said openings, said openings and gear-operating parts having coöperating means to cause the plates to be shifted and to engage other parts to prevent their operation when one of said parts is operated and means for restoring each plate to its normal position when said gear operating part is again moved to bring the respective gear out of operation.

9. An apparatus for computing the cost of quantities of material measured by a measuring apparatus, comprising driving shafts, each operated in given relation with a moving part of said measuring apparatus and having pinions fixed to them, driven shafts each having pinions fixed thereto, gears having different transmission ratios and capable of being shifted into engagement with the corresponding pinions of the associated driving and driven shafts, means for adding together the rotations of said driven shafts, means for indicating the sum of said rotation, a rocking, differently toothed quadrant for each gear, a shaft for each pair of associate driven and driving shafts having pinions each adapted to mesh with one of said quadrants, means for actuating any desired gear and the respective quadrant, and means to indicate the rotation of last named shaft.

10. An apparatus for computing the cost of quantities of material measured by a measuring apparatus, comprising two driving shafts each operated in given relation with a moving part of said measuring apparatus and having pinions fixed to them, two driven shafts each having pinions fixed thereto, gears having different transmission ratios and capable of being shifted into engagement with the corresponding pinions of the associated driving and driven shafts, means for shifting any of said gears at will, one of said driven shafts operating a member of one differential gearing, and the other driven shaft operating the other member of said differential gearing and means operated by the driven member of the differential gearing to indicate the sum of the rotations of said driven shafts.

In testimony whereof I affix my signature.

GIULIO VISCONTI PRASCA.